E. LIÉGEY.
FASTENING PINS TO ARTIFICIAL TEETH.
APPLICATION FILED JUNE 6, 1911.
1,061,244.
Patented May 6, 1913.
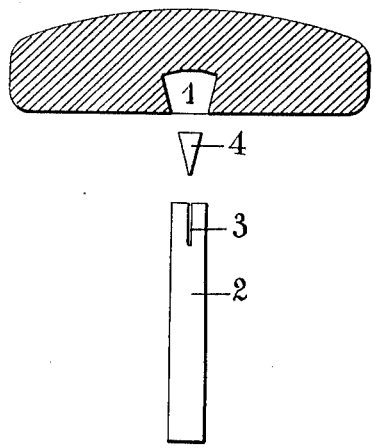
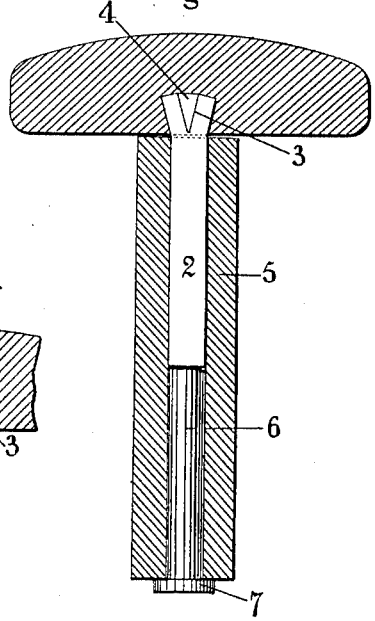
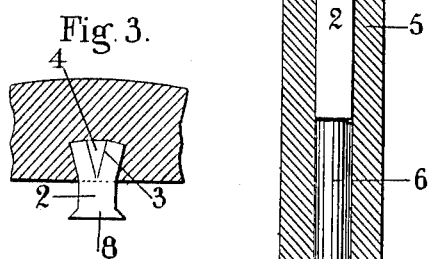
INVENTOR
EDOUARD LIÉGEY

UNITED STATES PATENT OFFICE.

EDOUARD LIÉGEY, OF PARIS, FRANCE.

FASTENING PINS TO ARTIFICIAL TEETH.

1,061,244.   Specification of Letters Patent.   Patented May 6, 1913.

Application filed June 6, 1911. Serial No. 631,512.

*To all whom it may concern:*

Be it known that I, EDOUARD LIÉGEY, a citizen of the Republic of France, and a resident of 19 Rue du Mont-Dore, Paris, France, have invented certain new and useful Improvements in Fastening Pins to Artificial Teeth, of which the following is a full, clear, and exact specification.

The present invention relates to the production of artificial dentures and particularly to dentures adapted to receive fixation pins, the object of my invention being to mold the recess which receives the pin end, with greater accuracy than has heretofore been attained, so that the pin end may be spread therein and thus securely anchored without the use of solder or cement to make rigid its joint with the denture.

In the accompanying drawings, Figure 1 is a dropped elevation of a tooth, fixation pin and wedge, the tooth being shown diagrammatically and in section; Fig. 2 is a vertical section through a tooth showing the pin in fixed position, and the apparatus for inserting it; and Fig. 3 is a partial section through a tooth showing a pin of different form.

It has heretofore been proposed to form a pin cavity in artificial dentures by means of cores of combustible material which are molded in the denture material and consumed during the baking of the denture. This practice results in a denture cavity of uncertain dimensions, since the core offers little or no resistance to the uneven contraction of the denture material during baking. I now propose to form this pin cavity by means of a core which retains its shape and condition without change during the baking process. Since the cavity is undercut and the core must be removed without injury to the denture, I prefer to dissolve out the core with a solvent which does not affect the porcelain. The core material must be such that it does not injuriously affect the material of the denture during baking, which does not change its shape at baking temperature or under the influence of the contraction of the denture material, and which may be dissolved out of the denture by the use of a solvent which is not injurious to the denture material. For this purpose, platinum responds completely to the requisite conditions. The method which I employ consists in embedding in the paste from which the denture is molded, a platinum core which has the precise shape which it is desired the cavity should possess. The denture is then baked, during which period of baking the platinum retains its shape and character unaffected by the firing conditions. After baking and cooling, the denture is plunged in a bath of aqua regia, which completely dissolves the platinum leaving the cavity bare. In this undercut cavity, which may if necessary be smoothed, or polished, I secure a pin of any desired character. Inasmuch as this pin does not have to form a core or be subjected to the conditions which exist during the firing of the tooth, it may be made of any suitable material, and the latter may be very much less expensive than platinum. The platinum, which has been dissolved out of the aqua regia may be recovered by any well known method so that it may be shaped into cores for reuse.

To secure the fixation pin in position in the cavity 1 of the denture, the pin 2 may be transversely slotted at 3 in one end, so that when it is driven in against the wedge 4, the ends of the pin are spread against the undercut walls of the cavity as shown in Fig. 2. To facilitate the introduction of the pin, it may be carried by a sleeve 5 within which works a driving plunger 6, the inward movement of which is limited by the head 7 thereon. If desired, the outer end of the pin may be spread at 8 (Fig. 3) to form an anchor in the tooth root in which the pin is inserted.

By reason of the exactitude with which the cavity 1 is formed in the denture by my improved process, the spread end of the pin may be slotted and the dimensions of the wedge 4 so predetermined that an exact fit of the pin end in the cavity is secured without the use of solder or cement. An exact mechanical joint is thus attained.

Having thus described my invention, what I claim as such and desire to secure by Letters Patent is:—

The method of preparing an artificial denture to receive an anchor pin which consists in molding the plastic denture material upon a wedge-shaped platinum core, baking the denture on said core and then dissolving out the latter to obtain a denture having in its root face an undercut recess of predetermined shape and dimensions adapted to receive and retain without cement the spread end of an anchor pin, substantially as described.

In testimony whereof I have signed my name to this specification, in the presence of two subscribing witnesses.

EDOUARD LIÉGEY.

Witnesses:
  H. C. COXE,
  LEON PEILLET.

---

Copies of this patent may be obtained for five cents each, by addressing the "Commissioner of Patents, Washington, D. C."